(12) United States Patent
Yu

(10) Patent No.: US 6,264,285 B1
(45) Date of Patent: Jul. 24, 2001

(54) FREE-WHEEL HUB TRANSMISSION MECHANISM

(76) Inventor: Mark Yu, 9F, No. 83, Wu-Chuan-Hsi-San St., Hsi Dist., Taichung City (TW)

(*) Notice: Subject to any disclaimer, the term of this patent is extended or adjusted under 35 U.S.C. 154(b) by 0 days.

(21) Appl. No.: 09/513,360

(22) Filed: Feb. 25, 2000

(51) Int. Cl.⁷ ..................................................... B60B 27/00
(52) U.S. Cl. ........................................... 301/110.5; 192/64
(58) Field of Search .............................. 301/105.1, 110.5, 301/124.2; 192/64; 29/894

(56) References Cited

U.S. PATENT DOCUMENTS

| | | | |
|---|---|---|---|
| 4,567,973 | * | 2/1986 | Butz ........................................ 192/64 |
| 5,433,306 | * | 7/1995 | Yang ....................................... 192/64 |
| 5,518,096 | * | 5/1996 | Lin .......................................... 192/64 |
| 5,642,796 | * | 7/1997 | Tabe ................................... 301/110.5 |
| 5,662,197 | * | 9/1997 | Tabe ...................................... 192/64 |

* cited by examiner

Primary Examiner—Russell D. Stormer
(74) Attorney, Agent, or Firm—Ladas & Parry

(57) ABSTRACT

A hub transmission mechanism includes an axle coaxially inserted into a through hole in a spoke-mounting barrel such that a right axle portion thereof extends outwardly from the spoke mounting barrel. The sprocket mounting member is sleeved around the right axle portion, and includes an inner shell disposed rotatably within an outer shell around the right axle portion. The central bore of the inner shell has a small-diameter outer section, a large-diameter inner section, and a shoulder therebetween. A locking member is disposed within the inner shell, and has an enlarged right end section that is disposed in the large-diameter inner section and that has an outer diameter greater than the diameter of the small-diameter outer section of the central bore for preventing removal of the locking member from the inner shell.

5 Claims, 4 Drawing Sheets

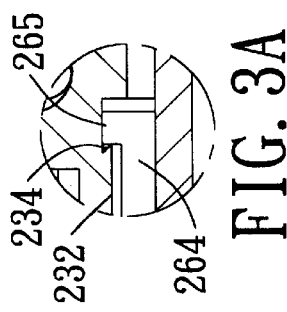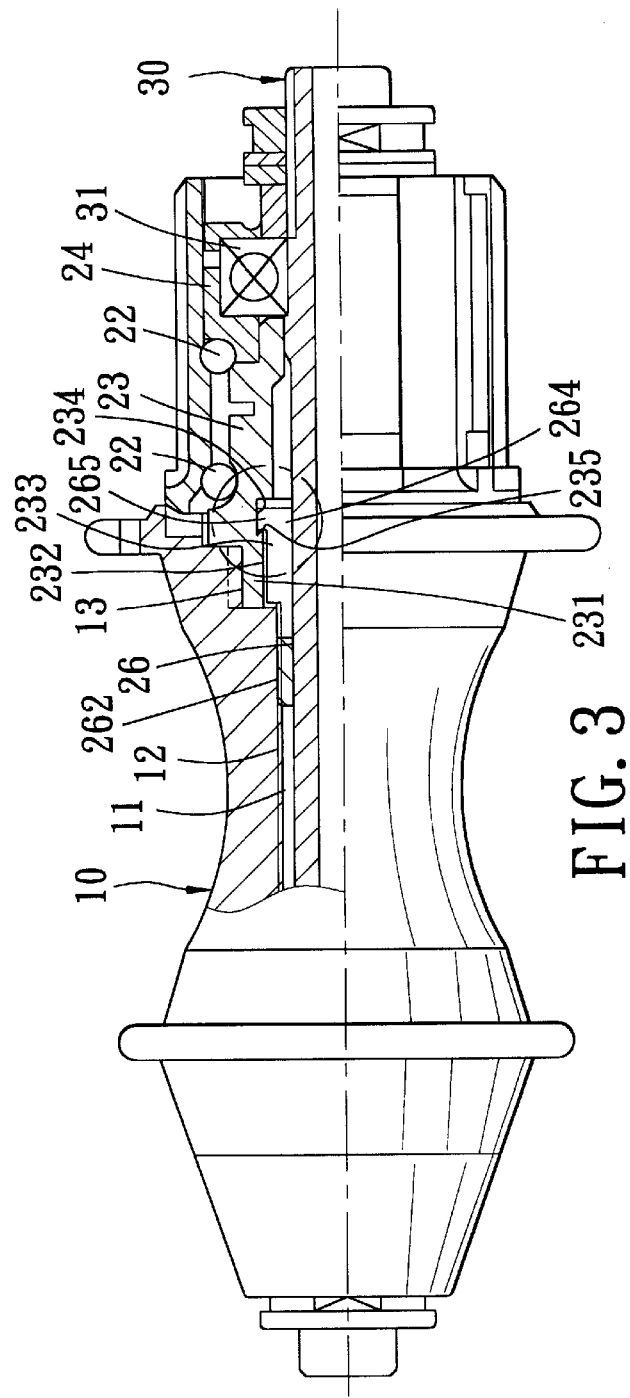

FREE-WHEEL HUB TRANSMISSION MECHANISM

BACKGROUND OF THE INVENTION

1. Field of the Invention

The present invention relates to a bicycle transmission mechanism, more particularly to a free-wheel hub transmission mechanism for a bicycle.

2. Description of the Related Art

Referring to FIG. 1, a conventional free-wheel hub transmission mechanism is shown to include an axle 3, a spoke-mounting barrel 1 rotatably mounted around the axle 3 in such a manner that a right axle portion 300 thereof projects outwardly from a right end portion 100 of the spoke-mounting barrel 1. A sprocket mounting member 2 is sleeved around the right axle portion 300 of the axle 3 adjacent to the right end portion 100 of the spoke-mounting barrel 1. The sprocket-mounting member 2 includes an outer shell 201, upon which a sprocket (not shown) is adapted to be mounted, and an inner shell 203 disposed rotatably within the outer shell 201 around the right axle portion 300 by means of a ratchet mechanism. The inner shell 203 has a barrel-coupling portion 206, which extends into and which engages threadedly an internally threaded right end portion of the spoke-mounting barrel 1 such that the spoke-mounting barrel 1 is co-rotatable with the inner shell 203 of the sprocket-mounting member 2 in a single direction.

Some of the drawbacks of the aforementioned conventional free-wheel hub transmission mechanism are as follows:

The inner shell 203 of the sprocket-mounting member 2 has a central hole of a polygonal cross section adapted to receive an operating tool for rotation of the same with respect to the spoke-mounting barrel 1 prior to insertion of the axle 3 through the sprocket-mounting member 2 and the spoke-mounting barrel 1. It is noted that during assembly of the conventional hub transmission mechanism, a relatively large torque, as high as 2000 kgf-cm, is required to tighten the barrel-coupling portion 206 of the inner shell 203 in the internally threaded right end portion of the spoke-mounting barrel 1.

SUMMARY OF THE INVENTION

Therefore, the object of this invention is to provide a free-wheel hub transmission mechanism which includes a sprocket mounting member provided with an inner shell of a specific configuration and a tubular locking member that requires only a small amount of torque for mounting the inner shell on a spoke-mounting barrel.

Accordingly, a free-wheel hub transmission mechanism of the present invention includes an axle with left and right axle portions, a tubular spoke mounting barrel, a sprocket mounting member, and a tubular locking member. The spoke-mounting barrel has an internally threaded right end portion and an inner wall defining an axially extending through-hole. The axle extends co-axially through the through-hole of the spoke-mounting barrel. The right axle portion projects outwardly from the right end portion of the spoke-mounting barrel. The sprocket mounting member is sleeved around the right axle portion of the axle adjacent to the right end portion of the spoke-mounting barrel, and includes an outer shell and an inner shell disposed rotatably within the outer shell around the right axle portion. The inner shell has a barrel-coupling portion, which extends into the spoke-mounting barrel and which has a central bore extending therethrough. The central bore has a small-diameter outer section, a large-diameter inner section provided with a diameter larger than that of the small-diameter outer section, and a shoulder between the outer and inner sections of the central bore in the inner shell. The locking member is disposed within the inner shell, and has an enlarged right end section that is disposed in the large-diameter inner section and that has an outer diameter greater than the diameter of the small-diameter outer section of the central bore for preventing removal of the locking member from the inner shell, and an externally threaded left end section that engages threadedly the right end portion of the spoke-mounting barrel, thereby preventing axial movement of the sprocket mounting member relative to the spoke-mounting barrel. The locking member further has two open-ended axially extending slots at a right end thereof so as to split the enlarged right end section into two parts. A device is provided for preventing relative rotation between the sprocket mounting member and the spoke-mounting barrel.

During assembly of the hub transmission mechanism of the present invention, only a relatively small torque is applied on the operating tool in order to fasten the inner shell on the internally threaded right end portion of the spoke-mounting barrel prior to insertion of the axle through the sprocket mounting member, the locking member and the spoke-mounting barrel.

BRIEF DESCRIPTION OF THE DRAWINGS

Other features and advantages of this invention will become more apparent in the following detailed description of a preferred embodiment of this invention, with reference to the accompanying drawings, in which:

FIG. 3 is a schematic partly sectional view of the preferred embodiment, illustrating how an inner shell is fastened to a spoke-mounting barrel by the use of a tubular locking member.

DETAILED DESCRIPTION OF THE PREFERRED EMBODIMENT

Figure 1:
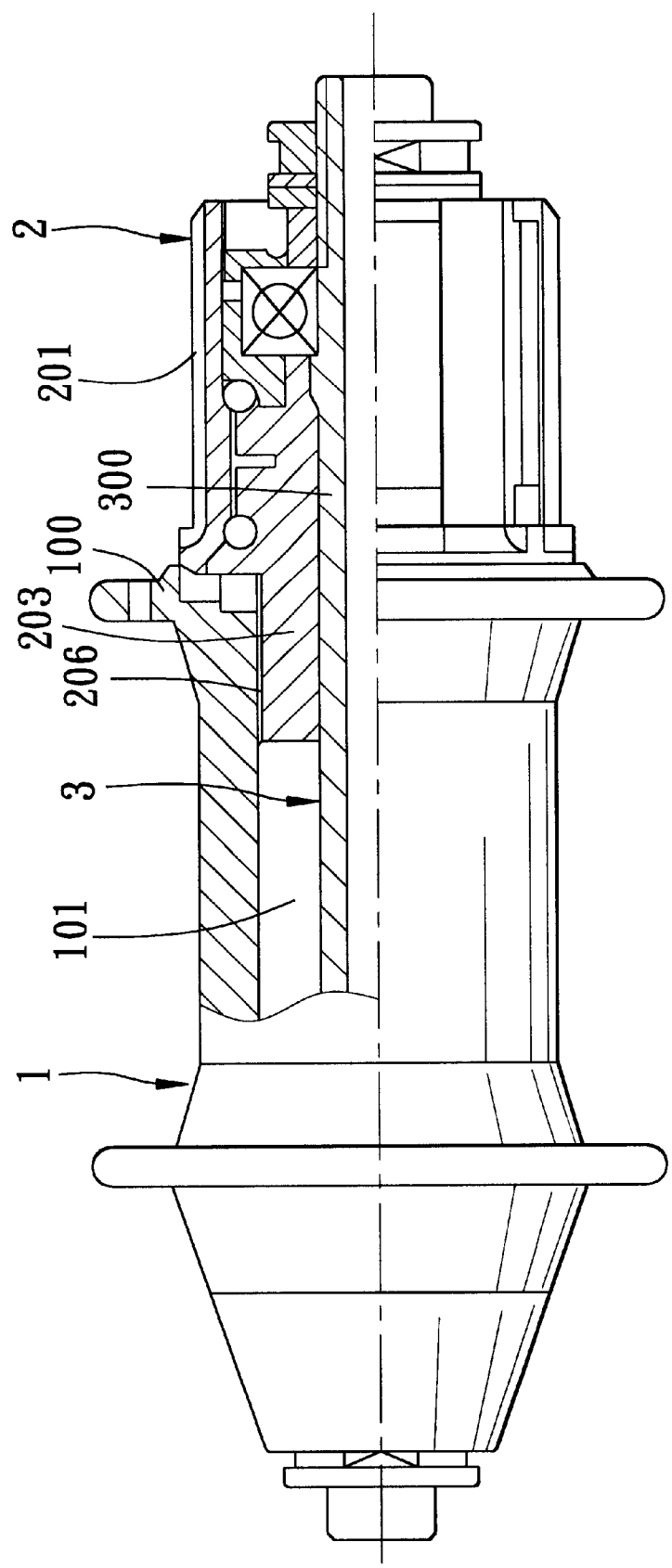
FIG. 1 is a partly sectional view of a conventional free-wheel hub transmission mechanism.
Figure 2:
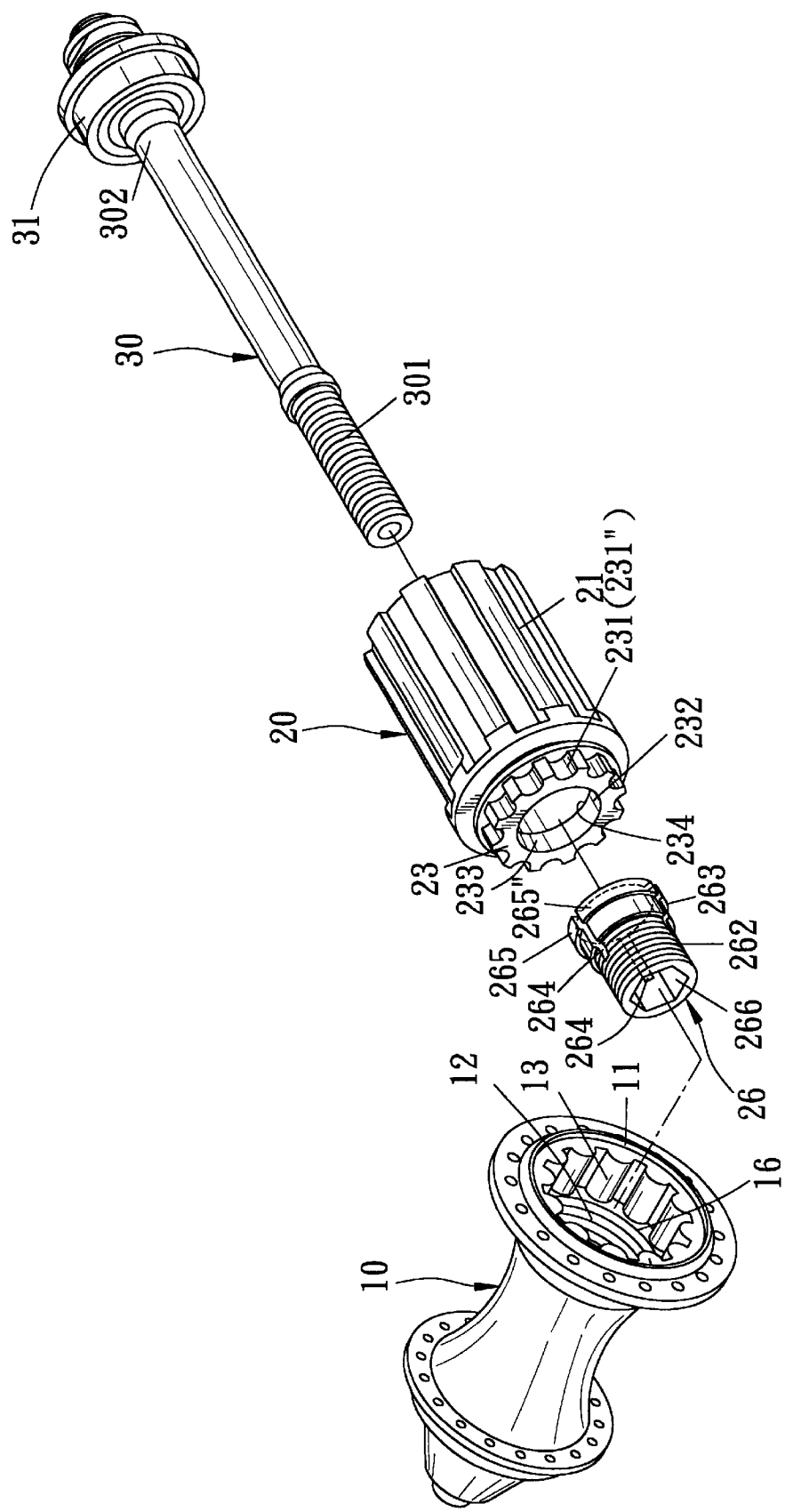
FIG. 2 is an exploded perspective view of the preferred embodiment of a free-wheel hub transmission mechanism of the present invention.

Referring to FIGS. 2 and 3, the preferred embodiment of a free-wheel transmission mechanism of the present invention is shown to include an axle 30 with left and right axle portions 301,302, a tubular spoke-mounting barrel 10, a sprocket mounting member 20, and a tubular locking member 26.

As illustrated, the spoke-mounting barrel 10 has an internally threaded right end portions 12, and an inner wall 11 that defines an axially extending through-hole. When the spoke-mounting barrel 10 is disposed around the axle 30, the latter extends co-axially through the through-hole such that the right axle portion 302 of the axle 30 is disposed outwardly of the right end portion 12 of the spoke-mounting barrel 10.

The sprocket mounting member 20 is sleeved around the right axle portion 302 of the axle 30 adjacent to the right end portion 12 of the spoke-mounting barrel 10, and includes an outer shell 21 and an inner shell 23 disposed rotatably within the outer shell 21 around the right axle portion 302. The inner shell 23 has a barrel-coupling portion 231, which extends into the spoke-mounting barrel 10 and which defines a central bore 232 therethrough. The central bore 232 has a small-diameter outer section 233, a large-diameter inner section 234 provided with a diameter larger than that of the small-diameter outer section 233, and a first shoulder 235 between the outer and inner sections 233,234 of the central bore 232 in the inner shell 23.

The locking member 26 is disposed within the inner shell 23, and has an enlarged right end section 265 that is disposed in the large-diameter inner section 234 and that has an outer diameter slightly greater than the diameter of the small-diameter outer section 233 of the central bore 232 for preventing removal of the locking member 26 from the inner shell 23, and an externally threaded left end section 262 that engages threadedly the right end portion 12 of the spoke-mounting barrel 10, thereby preventing axial movement of the sprocket mounting member 20 relative to the spoke-mounting barrel 10. The locking member 26 further has two open-ended axially extending slots 264 at a right end thereof so as to split the enlarged right end section 265 into two parts 265".

A known means is provided for preventing relative rotation between the sprocket mounting member 20 and the spoke-mounting barrel 10. In assembly, the parts 265" are pressed toward each other, thereby permitting passage of the enlarged right end section 265 through the small-diameter outer section 233 of the central bore 232 in the inner shell 23. When the enlarged right end section 265 moves entirely into the large-diameter inner section 234 of the central bore 232, the parts 265" move automatically away from each other, thereby confining the enlarged right end section 265 within the large-diameter inner section 234 of the central bore 232.

Figure 4:
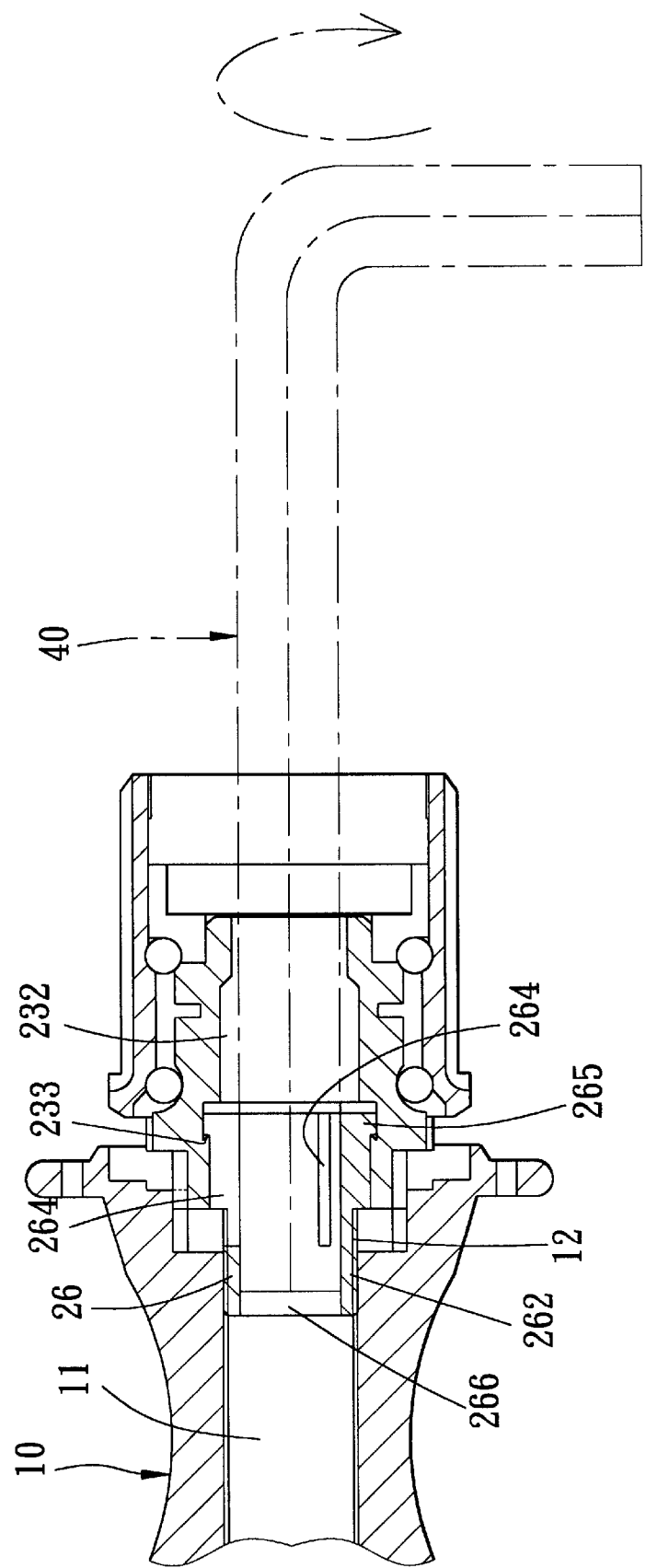
FIG. 4 is a fragmentary sectional view of the preferred embodiment, illustrating how the inner shell is fastened to the spoke-mounting barrel by the use of the tubular locking member prior to insertion of an axle therethrough.

The externally threaded left end section 262 of the locking member 26 has a central hole 266 of a hexagonal cross section adapted to receive an L-shaped operating tool 40 (see FIG. 4). Thus, during assembly of the hub transmission mechanism of the present invention, the locking member 26 can be rotated by the operating tool 40 with respect to the spoke-mounting barrel 10 prior to insertion of the axle 30 through the sprocket mounting member 20, the locking member 26 and the spoke-mounting barrel 10. It is noted that a relatively small torque of only about 250 kgf-cm is required to tighten the locking member 26 relative to the spoke-mounting barrel 10.

In the preferred embodiment, an internally splined section 13 is formed in the spoke-mounting barrel 10 outboard to the internally threaded right end portion 12, thereby forming a second shoulder 16 therebetween. An externally splined section 231" is formed on the barrel-coupling portion 231 of the inner shell 23 to engage the internally splined section 13. The externally splined section 231" and the internally splined section 13 cooperatively constitute means for preventing relative rotation between the sprocket mounting member 20 and the spoke-mounting barrel 10.

The locking member 26 further includes an intermediate section 263 interposed between the enlarged right end section 265 and the externally threaded left end section 262, and has an axial length shorter than that of the small-diameter outer section 233 of the central bore 232 in the inner shell 23 such that the externally left end section 262 of the locking member 26 is tightened within the internally threaded right end portion 12 of the spoke-mounting barrel 10 so as to abut the enlarged right end section 265 against the first shoulder 235 and so as to abut the externally splined section 231" against the second shoulder 16, thereby preventing relative axial movement between the sprocket mounting member 20 and the spoke-mounting barrel 10.

A pair of bearing units 22 is provided between the inner and outer shells 23, 21 in a known manner for smooth rotation of the inner shell 23 relative to the outer shell 21. A ratchet mechanism (not shown) can be provided to permit the inner shell 23 to rotate in only a single direction around the right axle portion 302 of the axle 30. The ratchet mechanism can be mounted in a conventional manner, which will not be described herein for the sake of brevity. Preferably, the inner shell 23 is formed with a bearing seat 24 for accommodation of a bearing unit 31 on the right axle portion 302 of the axle 30.

With this invention thus explained, it is apparent that numerous modifications and variations can be made without departing from the scope and spirit of this invention. It is therefore intended that the invention be limited only as indicated in the appended claims.

I claim:

1. A free-wheel hub transmission mechanism comprising:
an axle having left and right axle portions;
a tubular spoke-mounting barrel having an internally threaded right end portion and an inner wall defining an axially extending through-hole, said axle extending co-axially through said through-hole with said right axle portion projecting outwardly from said right end portion of said spoke-mounting barrel;
a sprocket mounting member sleeved around said right axle portion of said axle adjacent to said right end portion of said spoke-mounting barrel, and including an outer shell and an inner shell disposed rotatably within said outer shell around said right axle portion, said inner shell having a barrel-coupling portion, which extends into said spoke-mounting barrel and which has a central bore with a small-diameter outer section, a large-diameter inner section having a diameter larger than that of said small-diameter outer section, and a first shoulder between said outer and inner sections of said central bore in said inner shell;
a tubular locking member disposed within said inner shell, and having an enlarged right end section that is disposed in said large-diameter inner section and that has an outer diameter greater than the diameter of said small-diameter outer section of said central bore for preventing removal of said locking member from said inner shell, and an externally threaded left end section that engages threadedly said right end portion of said spoke-mounting barrel, thereby preventing axial movement of said sprocket mounting member relative to said spoke-mounting barrel, said locking member further having two open-ended axially extending slots at a right end thereof so as to split said enlarged right end section into two parts; and
means for preventing relative rotation between said sprocket mounting member and said spoke-mounting barrel.

2. The free-wheel hub transmission mechanism as defined in claim 1, wherein said externally threaded left end section of said locking member has a central hole of a polygonal cross section adapted to receive an operating tool for rotation of said locking member with respect to said spoke-mounting barrel prior to insertion of said axle through said sprocket mounting member, said locking member and said spoke-mounting barrel during assembly of said hub transmission mechanism.

3. The free-wheel hub transmission mechanism as defined in claim 1, wherein one of said right end portion of said spoke-mounting barrel and said barrel-coupling portion of said inner shell is formed with an externally splined section, the other one of said right end portion of said spoke-mounting barrel and said barrel-coupling portion of said inner shell being formed with an internally splined section that engages said externally splined section, said externally splined section and said internally splined section constituting said means for preventing relative rotation between said sprocket mounting member and said spoke-mounting barrel.

4. The free-wheel hub transmission mechanism as defined in claim 3, wherein said internally splined section is formed in said spoke-mounting barrel outboard to said internally threaded right end portion, thereby forming a second shoulder therebetween, said externally splined section being formed on said barrel-coupling portion of said inner shell.

5. The free-wheel hub transmission mechanism as defined in claim 4, wherein said locking member further includes an intermediate section interposed between said enlarged right end section and said externally threaded left end section, and has an axial length shorter than that of said small-diameter outer section of said central bore in said inner shell such that said externally left end section of said locking member is tightened within said internally threaded right end portion of said spoke-mounting barrel so as to abut said enlarged right end section against said first shoulder and so as to abut said externally splined section against said second shoulder, thereby preventing relative axial movement between said sprocket mounting member and said spoke-mounting barrel.

* * * * *